(12) United States Patent
Wrage

(10) Patent No.: US 7,971,545 B2
(45) Date of Patent: Jul. 5, 2011

(54) WATERCRAFT HAVING A KITE-LIKE ELEMENT

(75) Inventor: Stephan Wrage, Hamburg (DE)

(73) Assignee: Skysails GmbH & Co. KG, Hamburg (DE)

( * ) Notice: Subject to any disclaimer, the term of this patent is extended or adjusted under 35 U.S.C. 154(b) by 191 days.

(21) Appl. No.: 12/291,678

(22) Filed: Nov. 12, 2008

(65) Prior Publication Data

US 2009/0071388 A1  Mar. 19, 2009

Related U.S. Application Data

(63) Continuation-in-part of application No. 11/662,022, filed as application No. PCT/EP2005/009531 on Sep. 5, 2005, now abandoned.

(30) Foreign Application Priority Data

Sep. 6, 2004  (DE) ..................... 20 2004 013 840 U

(51) Int. Cl.
    *B63H 9/04* (2006.01)
(52) U.S. Cl. ................. 114/102.18; 114/39.21
(58) Field of Classification Search .............. 114/39.11, 114/39.21, 102.1, 102.16, 102.17, 102.18, 114/102.19, 102.2, 102.21, 102.28, 102.29, 114/102.3

See application file for complete search history.

(56) References Cited

U.S. PATENT DOCUMENTS

| | | | |
|---|---|---|---|
| 2,433,344 A | 12/1947 | Crosby | |
| 3,180,090 A | 4/1965 | Hawley et al. | |
| 4,102,291 A | 7/1978 | Sebald | |
| 4,497,272 A | 2/1985 | Veazey | |
| 5,271,351 A | 12/1993 | Horiuchi et al. | |
| 5,366,182 A * | 11/1994 | Roeseler et al. | 114/102.11 |
| 5,642,683 A * | 7/1997 | Bedford | 114/102.1 |
| 6,003,457 A * | 12/1999 | Chatelain | 114/39.11 |
| 6,254,034 B1 | 7/2001 | Carpenter | |
| 6,616,402 B2 | 9/2003 | Selsam | |
| 6,691,954 B1 * | 2/2004 | Harrington et al. | 244/155 A |
| 6,880,483 B2 * | 4/2005 | Fedders | 114/363 |
| 6,910,434 B2 * | 6/2005 | Lundgren | 114/102.1 |
| 6,918,346 B2 | 7/2005 | Grenier | |
| 2002/0139603 A1 | 10/2002 | Aiken et al. | |

FOREIGN PATENT DOCUMENTS

| | | |
|---|---|---|
| DE | 3817073 A1 | 12/1988 |
| FR | 2 781 195 A | 1/2000 |
| GB | 2 098 946 A | 12/1982 |
| GB | 2 098 950 A | 12/1982 |
| GB | 2 098 952 A | 12/1982 |
| GB | 2 294 666 A | 5/1996 |
| WO | WO 02/079030 | 10/2002 |
| WO | WO 03/097448 | 11/2003 |

OTHER PUBLICATIONS

J.F. Wellicome et al., "Ship Propulsive Kites—An Initial Study," University of Southampton, ISSN 01403818 SSSU 19, pp. i-71.
English Translation of the International Preliminary Report on Patentability.
International Search Report.

* cited by examiner

*Primary Examiner* — Lars A Olson
(74) *Attorney, Agent, or Firm* — Alix, Yale & Ristas, LLP

(57) ABSTRACT

The invention relates to a water craft comprising a kite element, which is connected to the water craft by a traction cable. The water craft is characterized in that the kite element is equipped with adjusting devices and an energy generation unit, which delivers energy when the tractive force that is exerted on the traction cable is modified.

22 Claims, 9 Drawing Sheets

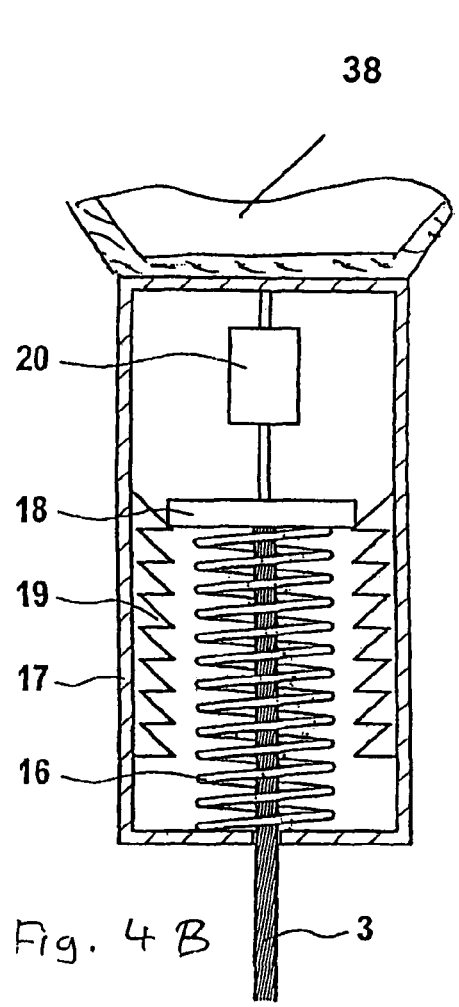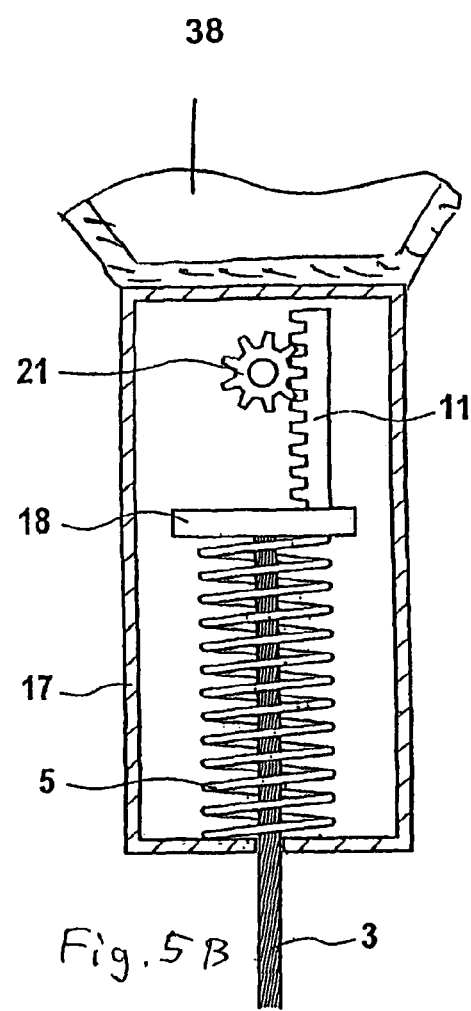

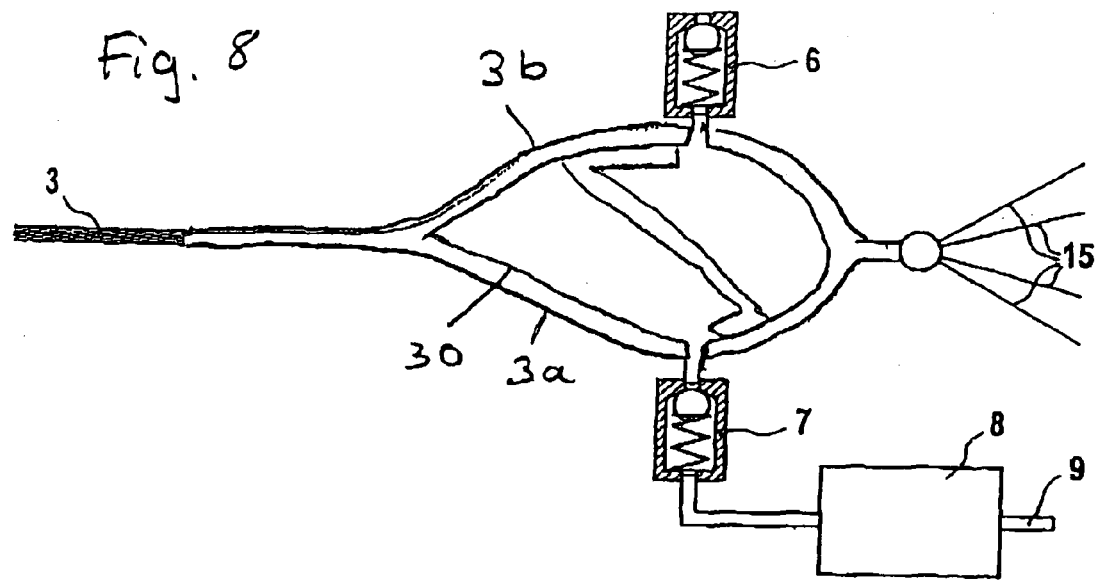
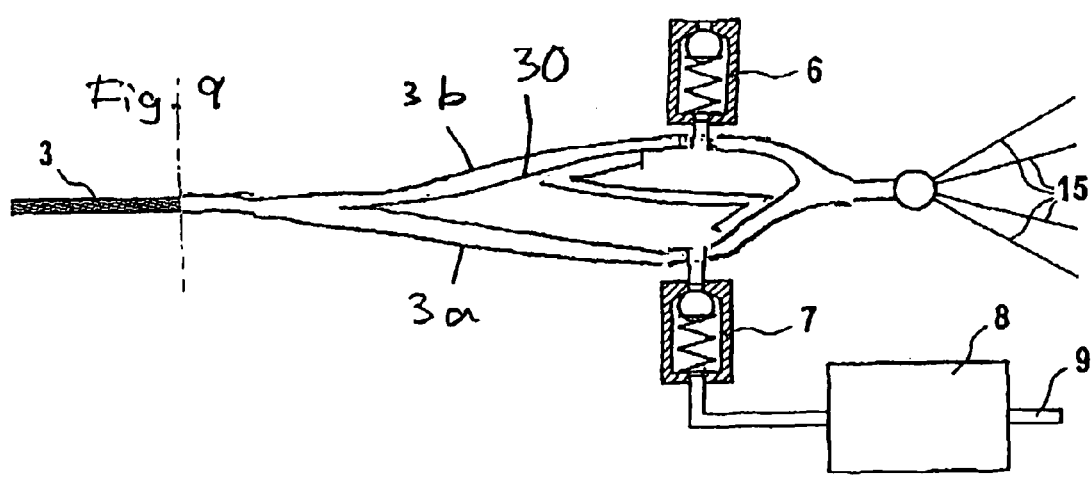

WATERCRAFT HAVING A KITE-LIKE ELEMENT

CROSS-REFERENCE TO RELATED APPLICATIONS

This application is a continuation-in-part of U.S. patent application Ser. No. 11/662,022 filed Mar. 5, 2007 now abandoned, the priority of which is claimed. U.S. patent application Ser. No. 11/662,022 is the national stage of International Application PCT/EP2005/009531, filed Sep. 5, 2005 which claims priority of German application 20 2004 013 840.9 filed Sep. 6, 2004.

BACKGROUND

The invention relates to a watercraft having a kite-like element, which is connected to the watercraft by a hawser.

In one already known watercraft (WO 01/192102 A1), it is possible for the kite-like element to be connected to the watercraft by a plurality of hawsers. In this case, the kite-like element is used to propel the vessel by wind, in which case this propulsion system can be operated exclusively by wind, or else the propulsion system uses the wind only to assist a mechanical propulsion system in order in this way to save fuel and to increase the speed. The kite-like element can be controlled by the plurality of hawsers. A plurality of hawsers have the disadvantage, however, that they must be hauled in and paid out individually in order to retrieve or to deploy the kite-like element. In addition, the plurality of hawsers could also become entangled. The cited document therefore also discloses a watercraft having a kite-like element of the type mentioned initially, in which only one hawser is provided, by means of which the stated problems are avoided.

However, this has the disadvantage that the kite-like element can no longer be controlled directly.

SUMMARY

A kite-like element is provided with adjusting devices and with a power generating device, which emits power when there is a change in the tensile force exerted on the hawser.

Adjusting devices are therefore provided, by means of which the shape of the sail of the kite-like element, the incidence angle, opening valves, the reefing processes and the like can be changed or provided. In this case, the control process can be carried out automatically by means of sensors provided on the kite-like element or, and this is particularly advantageous, by radio from the vessel. In this case, there are no problems in sending the signals to the kite-like element. However, a power supply is required for the adjusting devices.

The corresponding power is obtained by a power generating device, which emits power when there is change in the tensile force exerted on the hawser. No power could thus be obtained when the tensile force is constant. It would be necessary to allow the kite-like element to move further and further away from the vessel in order to obtain power from the product of the tensile force and the extension movement of the hawser. A solution such as this is, of course, impracticable. It has now been found that the power can be obtained by variation of the tensile force which is exerted on the hawser. When the expressions "obtain power" or "generate power" are used here, then, of course, this is not a question of creating energy from nothing and, in fact, all that takes place is energy conversion. It has been found that the tensile force varies, as a result of changing wind speeds, vessel movements as a result of the wave movement or else as a result of deliberately carried out movements in the path of the kite-like element, to such a major extent that power for controlling the kite-like element can be obtained from this.

The power generating device is arranged between the control pod of the kite-like element and the hawser. When the load on the hawser is low, the power generating device is in a relatively unloaded state. When the load becomes greater, the power generating device is subject to greater tensile stress. This tensile stress can be used to generate power.

Measurements have shown that up to 200% of the required steering power can be obtained from the change in the tensile force.

In one advantageous embodiment, the power generating device has a piston/cylinder unit with a spring-loaded piston, with the cylinder being connected to the hawser and with the piston being connected to the kite-like element, or with the cylinder being connected to the kite-like element and the piston being connected to the hawser, and with the cylinder being connected to a pressurized-fluid reservoir via a non-return valve. When the tensile force increases, the piston is moved against the spring force and compresses the fluid located in the cylinder, which can then be passed via a non-return valve to a pressurized-fluid reservoir. When the tensile force decreases, then the piston is moved in the opposite direction, and sucks in fluid once again from the outside, and this can likewise be controlled by a non-return valve. When the tensile force increases again, fluid is once again forced into the pressurized-fluid reservoir.

In one advantageous embodiment, the piston is arranged in the center of a piston/cylinder unit. Cylinder volumes are then located on both sides of the piston and are each connected via a non-return valve to the pressurized-fluid reservoir. When the tensile force rises, pressurized fluid is passed via one of the cylinder volumes to the pressurized-fluid reservoir, while pressurized fluid is sucked into the other cylinder volume. When the tensile force decreases and the piston is moved in the opposite direction by the spring or springs, then the pressurized fluid in the other cylinder volume is compressed, and is passed into the pressurized-fluid reservoir, while pressurized fluid is sucked into the first cylinder volume.

During this process, the piston operates against the pressure of the pressurized-fluid reservoir. When the pressure in the pressurized-fluid reservoir is high, that is to say a large amount of energy is stored, then the power generating device continues to supply fluid only when the tensile forces are very high. When little energy is present, that is to say the pressure in the pressurized-fluid reservoir is low, then the piston can supply new pressurized fluid even when the tensile forces are relatively low. In this case, it is self-evident that the arrangement must be provided with safety valves in order to avoid an excessively high overpressure when the tensile force is very high.

Instead of a piston/cylinder unit, it is possible to provide for the power generating device to be a structure like a sack with an airtight envelope, which is connected at one end to the hawser and at the other end to the kite-like element, is widened by elastic spreading elements, is drawn apart from one another when a tensile force occurs, reducing the volume, and is connected via a non-return valve to the pressurized-fluid reservoir. When the tensile force is only small, the sack-like structure is spread by the elastic spreading elements, and thus occupies a large volume. When the tensile force then increases, the volume of the sack-like structure is reduced, the pressure in it is increased and in consequence, provided that the pressure increase is great enough, air is passed to the pressurized fluid reservoir. It is self-evident that air is the suitable pressurized fluid in this embodiment. It would also be possible to use a hydraulic fluid for the above-mentioned energy generating device with a piston/cylinder unit, although, in this case as well, air is preferable for use as the pressurized fluid, for weight reasons and because of the possibility of leakage occurring.

By way of example, the sack-like structure can be woven around the hawser like a mesh. When the load becomes greater, the hawser is tensioned and the tension-loaded fibers surrounding the elastic envelope like a mesh try to move toward one another (in the attempt to be located parallel to one another), and thus compress the elastic, spread, air-filled envelope. In consequence, the air which is located in the envelope and has flowed in via a non-return valve is compressed, and can be passed to the pressurized-fluid reservoir, in a similar manner to that in the case of the piston/cylinder unit.

The pressurized fluid can be used directly for control purposes. However, it is also possible to connect the pressurized fluid reservoir to a generator for generation of electrical power, in which case the control process is then carried out by means of electrical power and not by means of the pressurized fluid. Even if the actual control process is carried out by means of the pressurized fluid, a small generator can be used to generate electrical power, by means of which valves are operated, sensors are supplied with electricity, etc.

Electrical power can be generated directly if provision is made for the power generating device to have a linear generator with a spring-loaded moving part, with the stator being connected to the hawser and with the moving part being connected to the kite-like element, or with the stator being connected to the kite-like element and the moving part being connected to the hawser. When the tensile force increases, the moving part is thus moved against the spring force and generates electricity. When the tensile force decreases, then the spring moves the moving part back, thus likewise generating electricity.

In another, physically similar, advantageous embodiment, the power generating device has a spring-loaded toothed rod which is arranged such that it can move in a component and drives a generator via a pinion which is mounted on the component, and the component is connected to the hawser and the toothed rod is connected to the kite-like element, or the component is connected to the kite-like element and the toothed rod is connected to the hawser. The method of operation is similar to that of the linear generator that has been mentioned, so that there is no need to describe this in any more detail.

In a further advantageous embodiment, the power generating device is a piezo-element. The piezo-element is connected to the hawser on one side and to the kite-like element on the other side. Electrical power is generated when the mechanical stress acting on the piezo-element changes.

In one advantageous embodiment, a plurality of power generating devices are provided, and are arranged in parallel or in series. Devices arranged in parallel result in more compressed air, pressurized fluid or amounts of energy, without the individual power generating device having to have large dimensions. If the power generating devices are arranged in series, then the tensile force is distributed over the individual power generating devices. When the wind strengths are low, that is to say when the tensile force is low, one of the power generating devices could be blocked, so that all of the tensile force acts on one power generating device in order in this way to obtain a sufficiently high pressure for control purposes. In contrast, when the tensile force decreases, then the two (or even more) power generating devices are used in series, so that the tensile force is distributed over the individual power generating devices, as a result of which the forces and pressures that occur are not as high.

Instead of one spring element, it is possible to provide a plurality of spring elements. By way of example, two spring elements are provided when the piston, the linear motor or the toothed rod are intended to be located in a central position when medium tensile forces occur. The greater the tensile force, the greater the extent to which the spring element is compressed or stretched, so that one spring element can be used both when the tensile forces are low and when the tensile forces are high. In addition, however, it is possible to provide for the spring force to be variable, in order in this way to achieve optimization for different tensile forces and wind strengths.

It would be possible to use a mechanical, in particular a metallic, spring in which the spring constant is continuously variable. However, in one advantageous embodiment, the spring is a compressed-air spring. The spring characteristic can be matched to the respective wind conditions by means of the pressure in the spring piston. The operating point of the kite-like element may vary considerably, depending on the wind speed. A variable spring is advantageous in order to allow power to be generated with the same arrangement at different wind speeds.

The piston can also be moved back, or the air sack spread, by using a portion of the pressurized fluid located in the pressurized-fluid reservoir for the return drive, instead of or in addition to using the spring force. In order to allow this arrangement to be used to generate power, the return drive must, of course, take place at a time when the tensile force is relatively weak.

A hydraulic fluid, in particular a hydraulic oil, is advantageously used as the pressurized fluid. This has the advantages of a physically small design and low weights for high actuating forces (by high pressures, rapid control capability and, owing to the incompressibility of the hydraulic fluid, no power consumption when the aim is to maintain a control state that has been reached). When the valves are closed, this control state is maintained in a particularly advantageous manner. Further advantages are good and widely used industry standards, as well as worldwide availability of the individual parts.

If a hydraulic fluid is used as the fluid, it is advantageous to store the hydraulic energy directly. A conventional industrial storage means can be used for this purpose which, in addition to the hydraulic fluid, also contains a compressible gas. The power generating device can store energy in this reservoir, increasing the pressure. When hydraulic fluid is taken from it, the pressure decreases, and the corresponding energy can be used. Since the kite-like element is a dynamic system which is subject to rapid changes in the direction of the force of gravity and the direction and the magnitude of the centrifugal force over the course of time, it is advantageous for the hydraulic fluid to be taken through a flexible hose, whose end is made heavier by a weight. Since hydraulic fluid is heavier than the compressible gas, the end of the hose that has been made heavier is always located in the hydraulic fluid supply. The aim of this is to ensure that hydraulic fluid can be taken in any maneuver state or flight state. In one alternative embodiment, the compressible gas can be separated from the hydraulic fluid by a membrane. When the hose is located in the liquid section of the reservoir in order to take hydraulic fluid from it, it is thus also possible to ensure that hydraulic fluid can be taken in any maneuver state and flight state, and is available for control purposes.

If the tension is constant, then no power can be obtained. However, a situation such as this will occur only rarely. However, the fluctuations in the tensile force when the wind is very uniform and there is little wave motion may not be sufficient to obtain enough power to control the kite-like element. In this case, it is possible to provide for a winch to be provided on the watercraft and can be used to vary the tensile force on the hawser by hauling in or paying out the hawser. The winch is therefore used to apply power, which is then transferred to the power generating device via the hawser.

In one advantageous embodiment, rather than using the winch to transfer a varying tensile force and thus oscillation energy from the vessel to the pod, which involves the disadvantage of high mass inertia and high holding forces being required, a separate hydraulic stamp is provided, which acts on the hawser and transfers energy by pulses. In another embodiment, or additionally, it is possible to provide for the winch to be arranged on a carriage, on which it can be moved backwards and forwards, which can also be done with the aid of a hydraulic stamp. This makes it possible not only to transfer power but also to move the point on which the hawser acts on the vessel.

When electrical power has been generated by the power generating device according to the invention, it is expedient to have the capability to store the power in a rechargeable battery which is arranged in the kite-like element. Storage of the power which is generated in the kite-like element is essential because this makes it possible to bridge periods in which the energy yield is low, for example when the kite-like element is hidden. Storage is also important in the situation in which the power generating unit fails and the aim is to safely recover the kite. An energy store can provide the storing energy required for this purpose.

As an alternative or in addition to the abovementioned capabilities for power generation and storage, it is possible to provide for the power generation device to have a spring which is designed to store the energy. An energy store such as this in the form of a spring has the advantage that it can release its force or its torque virtually immediately. The force or the torque is also made available until the stored energy has been consumed. Energy storage in the form of a spring also has the advantage that it is relatively light in weight. This makes it possible to avoid the disadvantage of possibly very heavy hydraulics, and the same amount of energy can be produced with less weight, but with the same force or torque being provided.

In one advantageous embodiment, the spring is a helical spring which stores the energy by compression or stretching.

In another advantageous embodiment, the spring is a spiral spring, one of whose ends interacts with an essentially cylindrical housing wall and whose other end is connected to a center shaft of the housing.

BRIEF DESCRIPTION OF THE DRAWINGS

The invention will be described by way of example in the following text using advantageous embodiments and with reference to the attached drawings in which, illustrated schematically:

FIG. 4B shows the embodiment of FIG. 4 as part of the pod of the kite-like element;
FIG. 5B shows the embodiment of FIG. 5 as part of the pod of the kite-like element;
FIGS. 8 and 9 show a seventh embodiment.

DETAILED DESCRIPTION

Figure 1:
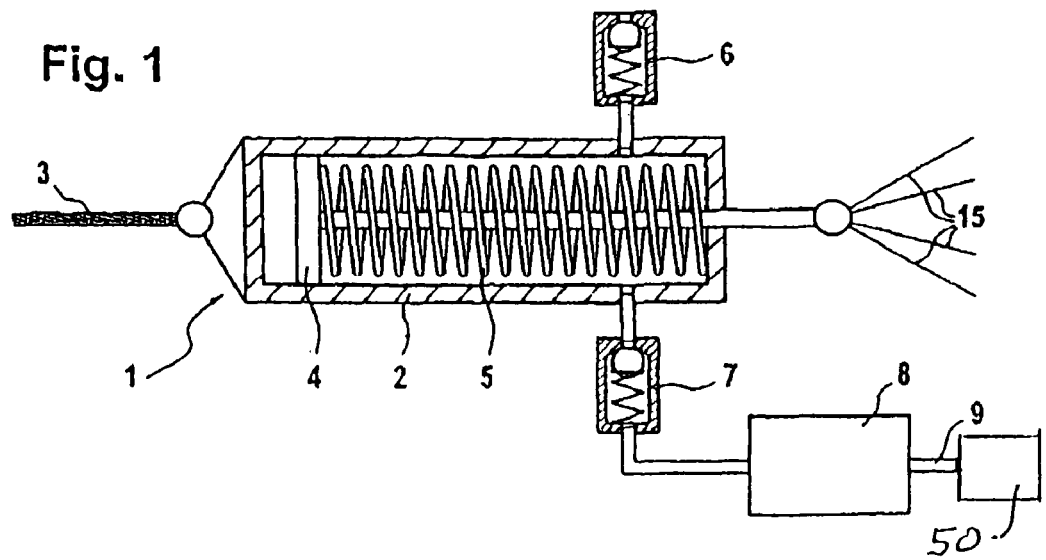
FIG. 1 shows the arrangement of a first embodiment.

FIG. 1 shows a power generating device in the form of a piston/cylinder unit 1. In this case, the cylinder 2 is connected to the hawser 3, while the piston 4 is connected via cables 15 to the kite-like element, or to its control pod. The piston 4 is forced to the left by a compression spring 5. The cylinder 2 is connected to the atmosphere by a first non-return valve 6, and is connected to a compressed-gas reservoir 8 via a second non-return valve 7. If the tensile force increases when the piston 4 is in the illustrated position, the piston 4 is then drawn to the right against the spring force 5, and forces the gas which is located in the cylinder 2 via the non-return valve 7 into the pressurized reservoir 8. When the pressure decreases, the piston 4 is moved back to the left again by the compression spring 5, the pressure in the cylinder decreases and, after being deflected sufficiently further to the left, new air is sucked in through the non-return valve 6. The compressed air 8 is then passed through a line 9 to the control elements, or possibly to a generator 50 in order to generate electrical power.

Figure 2:
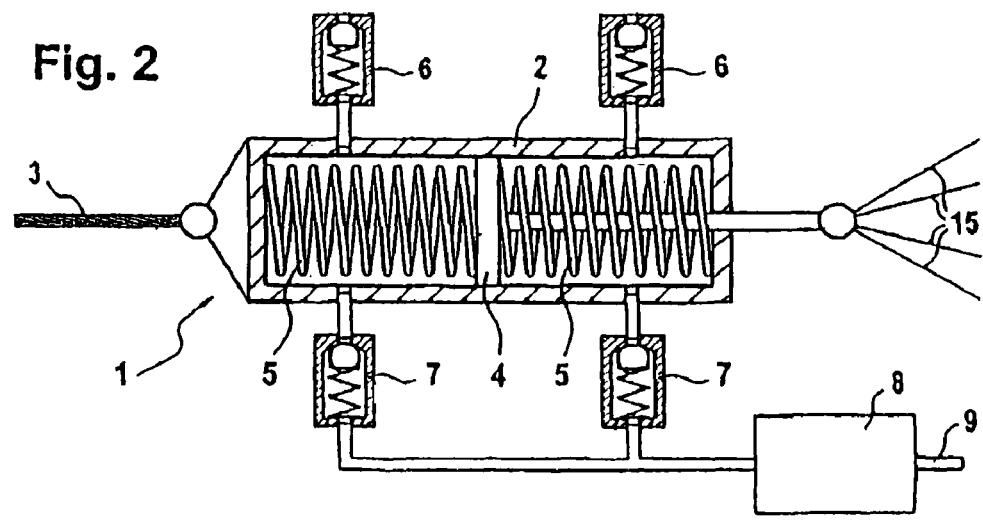
FIG. 2 shows the arrangement of a second embodiment.

In the embodiment shown in FIG. 2, the piston/cylinder unit 1 has two compression springs 5. When the pressure force is at a medium level, the piston 4 is in this case located in the center of the cylinder 2, as is illustrated in FIG. 2. In this case, non-return valves 6 are provided on both sides of the piston 4, in order to suck air in, and non-return valves 7 are provided in order to force air into the pressurized reservoir 8. When the pressure force increases, then air is sucked into the cylinder volume shown on the left in FIG. 2, and air is compressed in the volume shown on the right, and is passed to the pressurized reservoir 8. When the tensile force decreases, air is sucked into the right-hand cylinder volume, and air is compressed in the left-hand cylinder volume and is passed to the pressurized reservoir 8.

Figure 3:
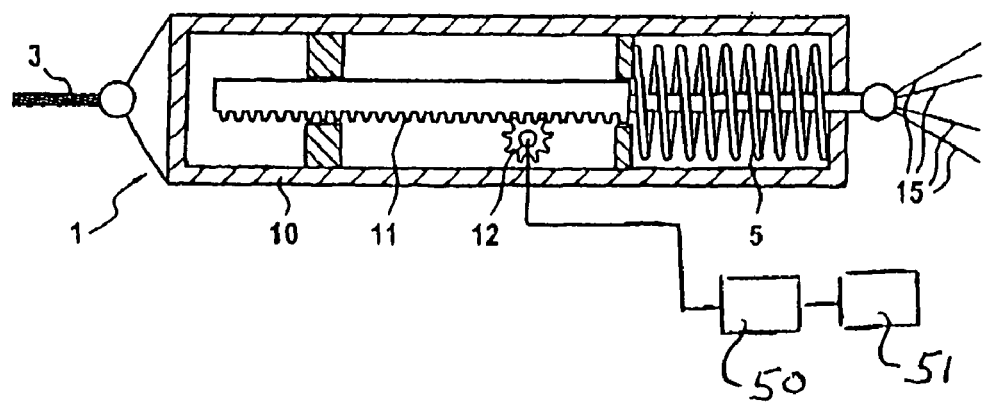
FIG. 3 shows the arrangement of a third embodiment.

In the embodiment shown in FIG. 3, a toothed rod 11 is loaded by a compression spring 5, is mounted in a housing 10 such that it can slide, and drives an electrical generator 50, via a pinion 12. When the tensile force rises, then the toothed rod 11 is moved to the right, causing the pinion 12 to rotate, so that electricity is generated. When the tensile force decreases, then the spring force 5 moves the toothed rod 11 in the opposite direction, causing the pinion 12 to rotate, thus likewise generating electricity. The generator may be operatively connected to a rechargeable battery 51.

Figure 4:
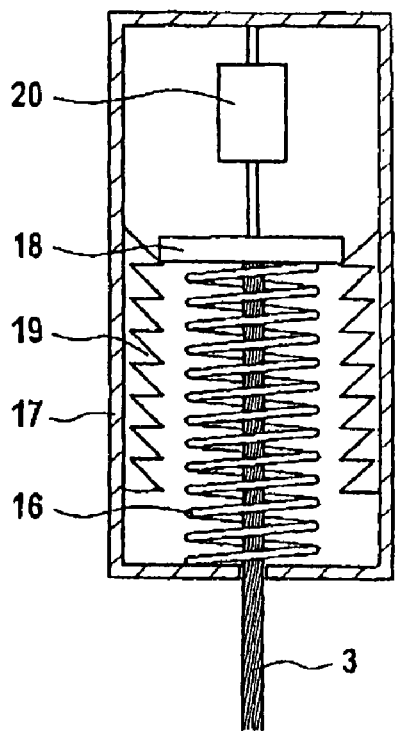
FIG. 4 shows a fourth embodiment.
Figure 5:
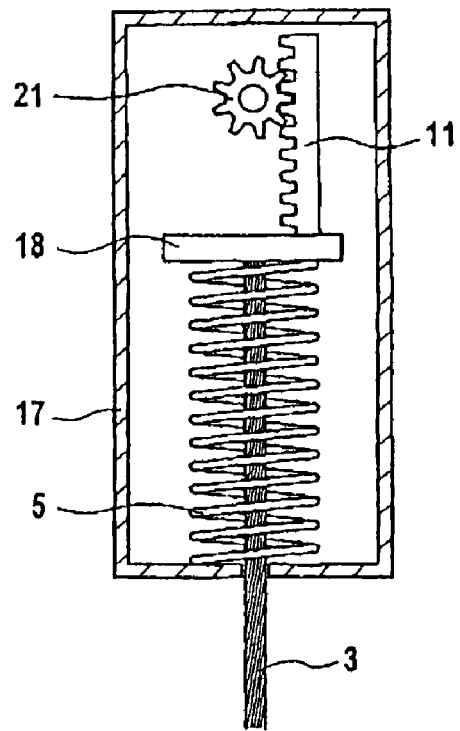
FIG. 5 shows a fifth embodiment.
Figure 6:
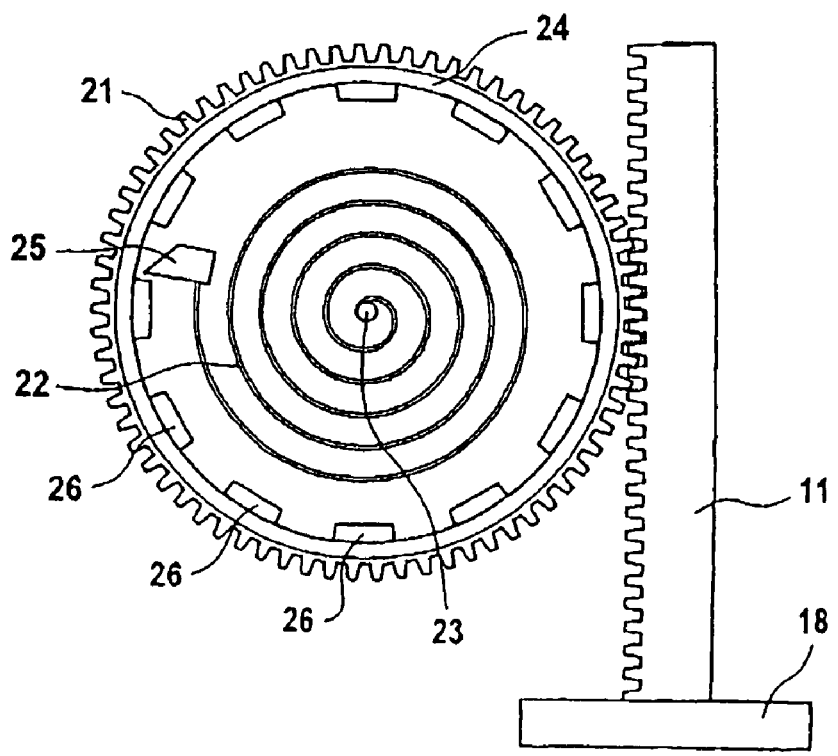
FIG. 6 shows a spiral spring store which can be used for the embodiment shown in FIG. 5.

FIGS. 4, 5 and 6 show the use of springs for energy storage. Energy stored can be used as an alternative or in addition to the embodiments of the power generating device mentioned above.

Figure 4A:
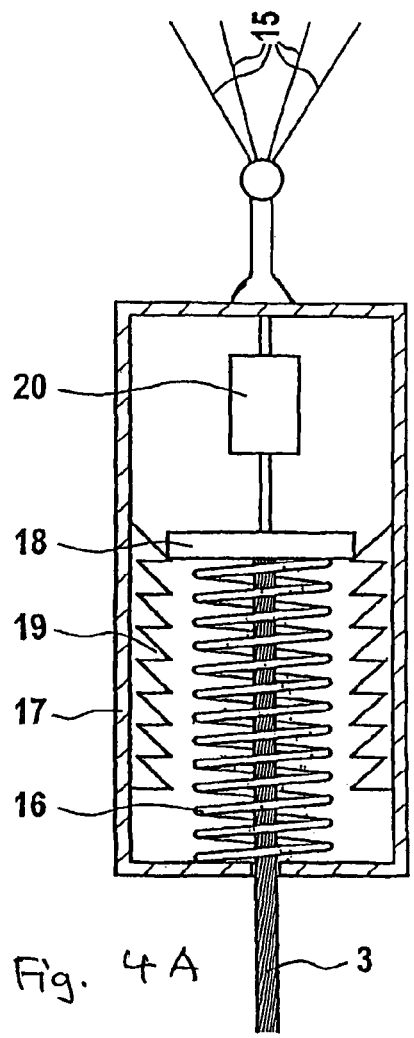
FIG. 4A shows the embodiment of FIG. 4 with cables attached.

In principle, a leaf spring, a helical spring or a spiral spring could be used as an energy store in the form of springs. The leaf spring, which absorbs and releases energy by bending, is one option which will not be described in any more detail here. FIG. 4 shows the use of a helical spring, which absorbs and releases energy by compression. However, the energy could also be stored by stretching of the spring. The helical spring 16 used to store the energy is arranged in a housing 17 which is connected to the pod (or gondola carrying the device for controlling the kite-like element) of the kite-like element by cable 15 as shown in FIG. 4A, or is part of this pod 38, by means of which the kite-like element is controlled, as shown in FIG. 14B. The hawser 3 loads the spring 16. In this case, if the force which is exerted by the hawser 3 is greater than the stress already provided by the spring, then the spring end plate 18 is drawn downwards in FIG. 4, and in the process latches into latching projections 19. Whenever the tensile force produced by the hawser 3 is greater than the stress in the spring, the end plate 18 is drawn downwards further, and more energy is stored. When power is needed, the latch on the end plate is removed, the plate 18 is moved upward by the spring force, and thus operates a power generating device 20. This power generating device could, for example, be a hydraulic cylinder, or (via a suitable deflection device) a cable could be stressed, by means of which flaps or the like are operated.

The energy store shown in FIG. 4 normally has a constant spring characteristic. This may be disadvantageous when the kite-like element is being flown in very different wind conditions, that is to say the magnitude of the tensile force which can be used to obtain power is fluctuating. In order to ensure that power is obtained optimally in this situation, one advantageous variant is for the spring not to be loaded directly by the hawser, but by a transmission which allows the spring constant to be matched to the tensile force from the kite. It is even simpler to use a lever to load the spring, on which the point at which the tensile force acts can be moved. The spring can always be loaded optimally by choosing the position at which the force acts on the lever.

Figure 5A:
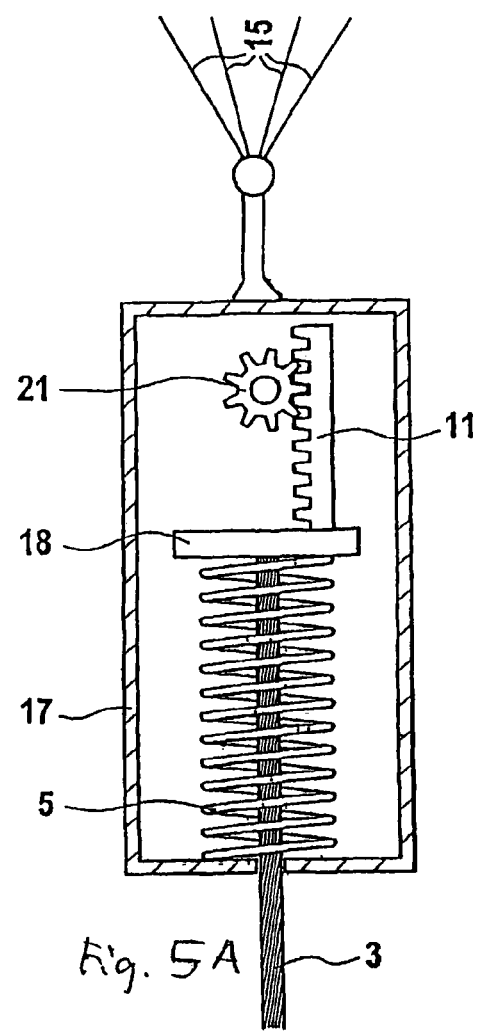
FIG. 5A shows the embodiment of FIG. 5 with cables attached.

In the embodiment shown in FIG. 5, the varying tensile force is first of all converted to a rotary movement. This can be done by connecting an elastic element 5 (preferably a pneumatic spring with a variable spring constant) between the hawser and the kite-like element. In this case, the spring 5 is once again arranged in a housing 17. The housing 17 is connected to the pod of the kite-like element (or gondola carrying the devices for controlling the kite-like element) by cable 15 as shown in FIG. 5A, or is part of the pod 38, by means of which the kite-like element is controlled, as shown in FIG. 5B. The force on the hawser 3 acts on an end plate 18, on which a toothed rod 11 is arranged. This toothed rod acts on a gearwheel 21 of an energy store 22 with a spiral spring, as is illustrated in more detail in FIG. 6. When an appropriately high tensile force occurs on the hawser 3, the plate 18 is drawn downwards together with the toothed rod 11 and "thus tightens the spiral spring store". When the tensile force decreases, the plate 18 is moved upward again by the spring 5, during which process the energy stored in the spiral spring does not change on account of a freewheeling capability.

The energy store in FIG. 5 is illustrated more clearly in FIG. 6. One end of the spiral spring 22 is connected to a center shaft 23 of the housing 24, in which the spiral spring 22 is located. When the toothed rod 11 is moved downward, then the housing 24 is rotated clockwise. A catch 25 is in this case held by latches 26 and is moved in the clockwise direction, thus loading the spring. During this process, a latching means that is not shown prevents the catch 25 from moving in the counterclockwise direction, even when the stress produced by the latches 26 is no longer present. This is the situation at the moment where the toothed rod 11 is moved upward and the housing 24 is rotated in the counterclockwise direction.

The catch 25 can in this case slide over the latching projections 26. The original position of the housing 24 is restored, so that an additional stress can be exerted on the spiral spring 22 again as soon as the tensile force is sufficiently large. The torque of the loaded spring 22 in this case acts continuously on the center shaft 23, so that power can be tapped off here all the time, while new energy can be supplied at the same time from the outside, by means of the toothed rod 11.

It would also be feasible to use the rotary movement of the housing 24, by means of which the spring is loaded, to obtain power. In this case, the locking of the catch 25 would then have to be released, thus unloading the spring and making it possible to take power from the shaft. However, this solution has the disadvantage that it is not possible to supply any new energy while power is being taken. This disadvantage is avoided with the embodiment in which the power is tapped off by means of the center shaft 23. If this arrangement is chosen, there are a number of operating states:

i. Unloaded and at rest: the spiral spring 22 is unloaded, and the overall system is at rest.
ii. The spring 22 is loaded: the spiral spring 22 is wound up and is storing energy.
iii. The spring is unloaded: the spiral spring 22 is unloaded and in this case rotates in its housing 24, the unit for obtaining power rotates freely with the shaft 23.
iv. The spring is loaded and unloaded: the spiral spring 22 is wound up on one side (at 25), while it is unloaded at the same time (at 23).

Figure 7:
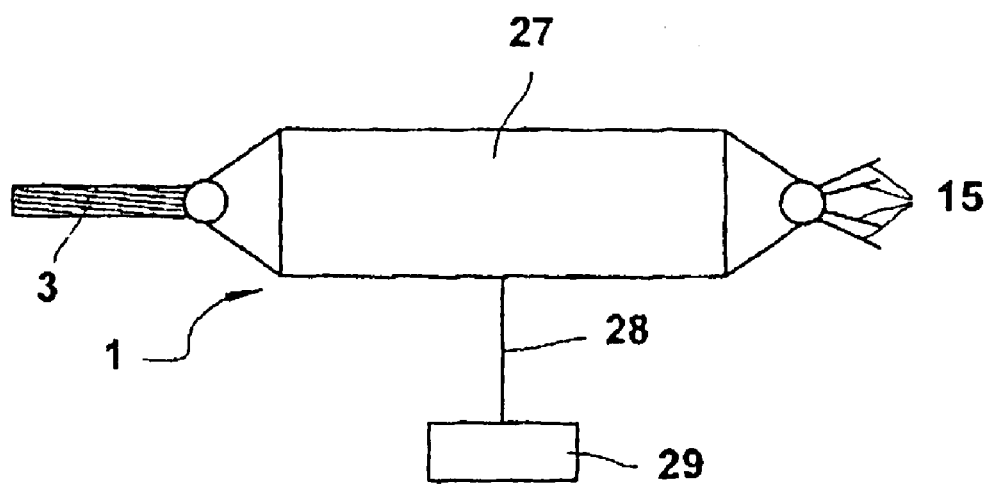
FIG. 7 shows a sixth embodiment.

FIG. 7 shows a power generating unit in the form of a piezo-element 27. When the mechanical stress acting on the piezo-element 27 changes, electrical power is generated. The electrical power is passed via a line 28 to a storage means 29, where it is stored.

FIG. 8 shows a sack-like structure 30 that is woven around the hawser like a mesh at 3a, 3b. When the load becomes greater, the hawser 3 is tensioned and tension loaded fibers 3a, 3b surrounding elastic envelope 30 like a mesh try to move toward one another (in an attempt to be located parallel to one another) and thus compress the elastic spread air-filled envelope 30. In consequence the air which is located in the envelope 30 and has flowed in via a non-return valve 6 is compressed and can be passed to the pressurized-fluid reservoir 8 in a similar manner to that of the case of the piston/cylinder unit of FIG. 1. FIG. 8 shows the arrangement with low tension of the hawser 3, whereas FIG. 9 shows the arrangement with large tension of hawser 3.

Figures 10, 11:
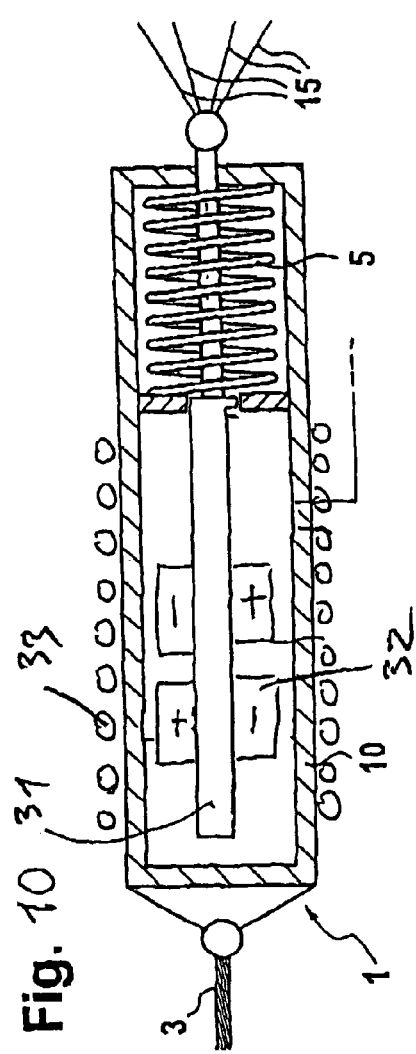
FIG. 10 shows an eighth embodiment.
FIG. 11 shows a ninth embodiment.

In the embodiment shown in FIG. 10, a rod 31 is loaded by compression spring 5 and mounted in a housing 10 such that it can slide. Rod 31 is part of a linear generator of the type known per se. Rod 31 carries magnets 32. The housing 10 is surrounded by a coil or stator 33. When rod 31 and the magnets 32 move, an electrical current is induced in coil 33, thus generating the electricity.

The embodiment of FIG. 11 shows the use of more than one generator. In this case, each generator is similar to the generator shown in FIG. 1.

Figure 12:
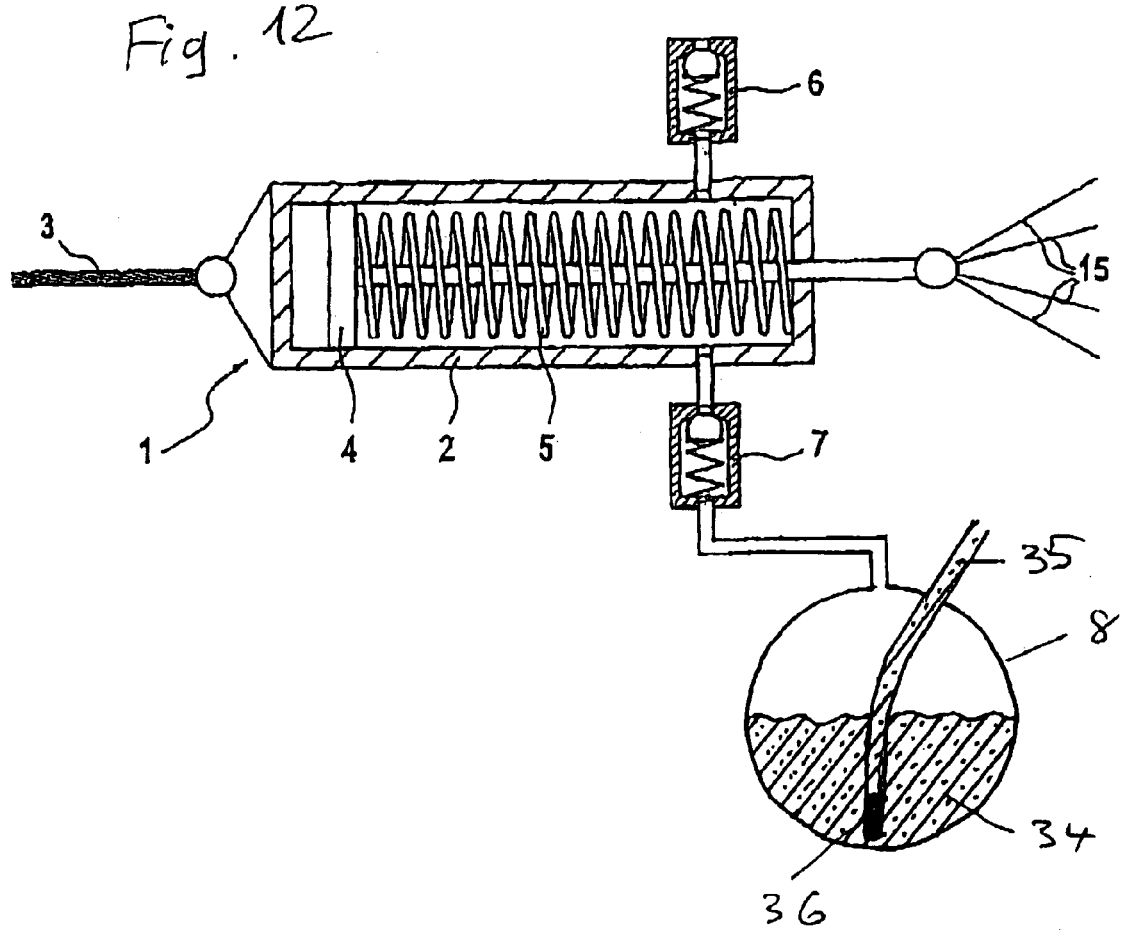
FIG. 12 shows a tenth embodiment.

In the embodiment shown in FIG. 12 the compressed-gas reservoir 8 contains a hydraulic fluid 34. This hydraulic fluid is set under pressure by the pressure of the compressed air. The pressurized hydraulic fluid 34 leaves reservoir 8 through the flexible hose 35. In order that the end of the hose remains at the bottom of reservoir 8 and thus totally immersed into the hydraulic fluid 34 (such that no pressurized air exits to hose 35), hose 35 has a heavy weight 36 at its end.

Figure 13:
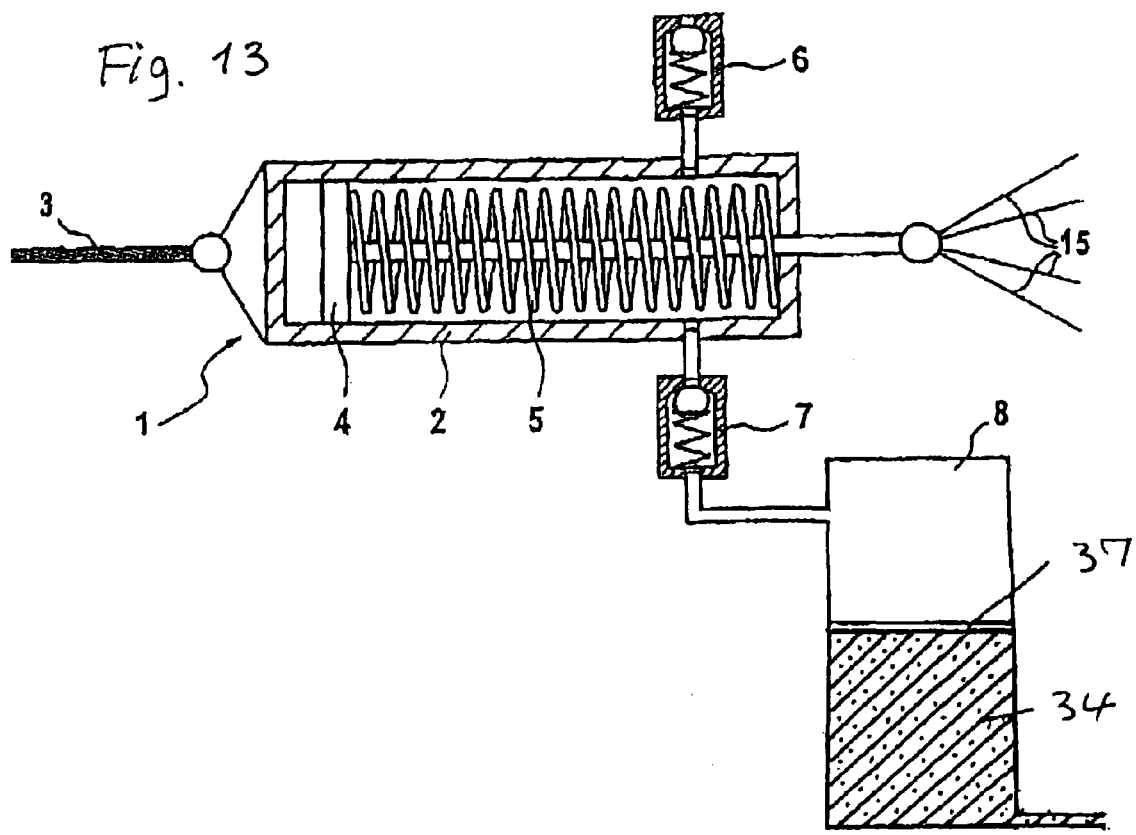
FIG. 13 shows an eleventh embodiment.

In the embodiment shown in FIG. 13, the pressurized-air and the hydraulic fluid 34 in the reservoir 8 are separated by a membrane 37.

The invention claimed is:

1. A watercraft having a kite element for propulsion of the watercraft, which is connected to the watercraft by a hawser configured to experience tensile force, characterized in that the kite element is provided with adjusting devices for adjusting the kite, with a power generating device which uses a change in tensile force for generating power which is independent of the tensile force, which emits power when there is a change in the tensile force exerted on the hawser, and with a storage unit for storing power generated by the power generating device, and the adjusting devices are driven by the generated power.

2. The watercraft as claimed in claim 1, characterized in that the power generating device has a structure of a sack with an airtight envelope and having a volume, which is connected at one end to the hawser and at the other end to the kite element, is widened by elastic spreading elements drawn apart from one another when a tensile force occurs, reducing the volume of the sack, and is connected via a non-return valve to a pressurized-fluid reservoir.

3. The watercraft as claimed in claim 1, characterized in that the power generating device has a linear generator having a stator and a spring-loaded moving part, with the stator being connected to the hawser and the moving part being connected to the kite element, or with the stator being connected to the kite element and the moving part being connected to the hawser.

4. The watercraft as claimed in claim 1, characterized in that the power generating device has a piezo-element.

5. The watercraft as claimed in claim 1, characterized in that a plurality of power generating devices are provided, and are arranged in parallel or in series.

6. The watercraft as claimed in claim 1, characterized in that a winch is provided on the watercraft and can be used to vary the tensile force on the hawser by hauling in or paying out the hawser.

7. The watercraft as claimed in claim 1, characterized in that the power generating device has a spring which is designed to store energy.

8. The watercraft as claimed in claim 7, characterized in that the spring is a helical spring, which stores energy by compression or stretching.

9. The watercraft as claimed in claim 7, characterized in that the spring is a spiral spring, one of whose ends interacts with an essentially cylindrical housing wall and whose other end is connected to a center shaft of the housing.

10. A watercraft having a kite element for propulsion of the watercraft, which is connected to the watercraft by a hawser configured to experience tensile force, characterized in that the kite element is provided with adjusting devices and with a power generating device for generating power which is independent of the tensile force, which emits power when there is a change in the tensile force exerted on the hawser, the power generating device having a piston/cylinder unit with a spring-loaded piston, with the cylinder being connected to the hawser and with the piston being connected to the kite element, or with the cylinder being connected to the kite element and the piston being connected to the hawser, and with the cylinder being connected to a pressurized-fluid reservoir via a non-return valve.

11. The watercraft as claimed in claim 10, characterized in that the piston/cylinder unit has two cylinder volumes which are separated by the piston and which are connected, in each case via a non-return valve to the pressurized-fluid reservoir.

12. The watercraft as claimed in claim 10, characterized in that the pressurized-fluid reservoir is connected to a generator in order to generate electrical power.

13. The watercraft as claimed in claim 10, characterized in that air is used as the fluid.

14. The watercraft as claimed in claim 10, characterized in that a plurality of spring elements are provided for spring loading.

15. The watercraft as claimed in claim 10, characterized in that the spring loaded piston has a spring, said spring having a force that is variable.

16. The watercraft as claimed in claim 10, characterized in that, instead of the spring loaded piston including the spring or in addition to the spring, a portion of the fluid in the pressurized-fluid reservoir is used to reset the power generating device.

17. The watercraft as claimed in claim 10, characterized in that the fluid is hydraulic fluid.

18. The watercraft as claimed in claim 17, characterized in that the pressurized-fluid reservoir has an air cushion for the hydraulic fluid.

19. The watercraft as claimed in claim 18, characterized in that the hydraulic fluid is taken from the pressurized-fluid reservoir with the aid of a flexible hose, whose end is made heavier by a weight.

20. The watercraft as claimed in claim 18, characterized in that the hydraulic fluid and the air cushion are separated from one another by a membrane.

21. A watercraft having a kite element for propulsion of the watercraft, which is connected to the watercraft by a hawser configured to experience tensile force, characterized in that the kite element is provided with adjusting devices and with a power generating device for generating power which is independent of the tensile force, which emits power when there is a change in the tensile force exerted on the hawser, the power generating device having a spring-loaded toothed rod which is arranged such that it can move in a component and drives a generator via a pinion which is mounted on the component, and the component being connected to the hawser and the toothed rod being connected to the kite element, or the component being connected to the kite element and the toothed rod being connected to the hawser.

22. The watercraft as claimed in claim 21, characterized in that the kite element has a rechargeable battery for storage of electrical energy.

* * * * *